United States Patent [19]

Boer

[11] 3,960,207

[45] June 1, 1976

[54] HEAT EXCHANGE APPARATUS

[76] Inventor: Karl W. Boer, R.D. No. 3, Kennett Square, Pa. 19348

[22] Filed: Nov. 28, 1973

[21] Appl. No.: 419,799

[52] U.S. Cl. .......................... 165/104 R; 165/165; 126/400; 62/430
[51] Int. Cl.² ...................................... F28D 21/00
[58] Field of Search .......... 165/164, 165, 104, 166, 165/125; 126/400; 219/365, 378, 325; 62/430

[56] References Cited
UNITED STATES PATENTS

| 778,152 | 12/1904 | Soller et al. | 165/125 |
| 1,170,902 | 2/1916 | Harrison | 165/166 |
| 1,914,077 | 6/1933 | Cluchey | 165/166 X |
| 2,370,309 | 2/1945 | Hartwig | 165/125 X |
| 3,299,945 | 1/1967 | Rice et al. | 126/400 X |
| 3,566,961 | 2/1971 | Lorenz et al. | 165/160 X |

FOREIGN PATENTS OR APPLICATIONS

| 530,879 | 10/1921 | France | 165/125 |
| 950,234 | 2/1964 | United Kingdom | 219/365 |

Primary Examiner—Albert W. Davis, Jr.
Attorney, Agent, or Firm—C. Walter Mortenson

[57] ABSTRACT

A plurality of hollow, disc-like containers are each filled with a thermal energy storage material and placed in a stacked array. Each of the disc-like containers has a hole in the center and resembles a flat doughnut. A fluid such as air is directed radially inward between the container comprising the stacked array of containers and is exhausted through the central holes which together form a conduit. This effects a more efficient heat transfer between the thermal energy storage material and the surrounding fluid. In other embodiments described, the containers may assume various disc-like shapes such as double convex, plano-convex, concavo-convex and the like, thereby to achieve a more uniform heat transfer between the surrounding fluid and the thermal storage material as a whole.

15 Claims, 8 Drawing Figures

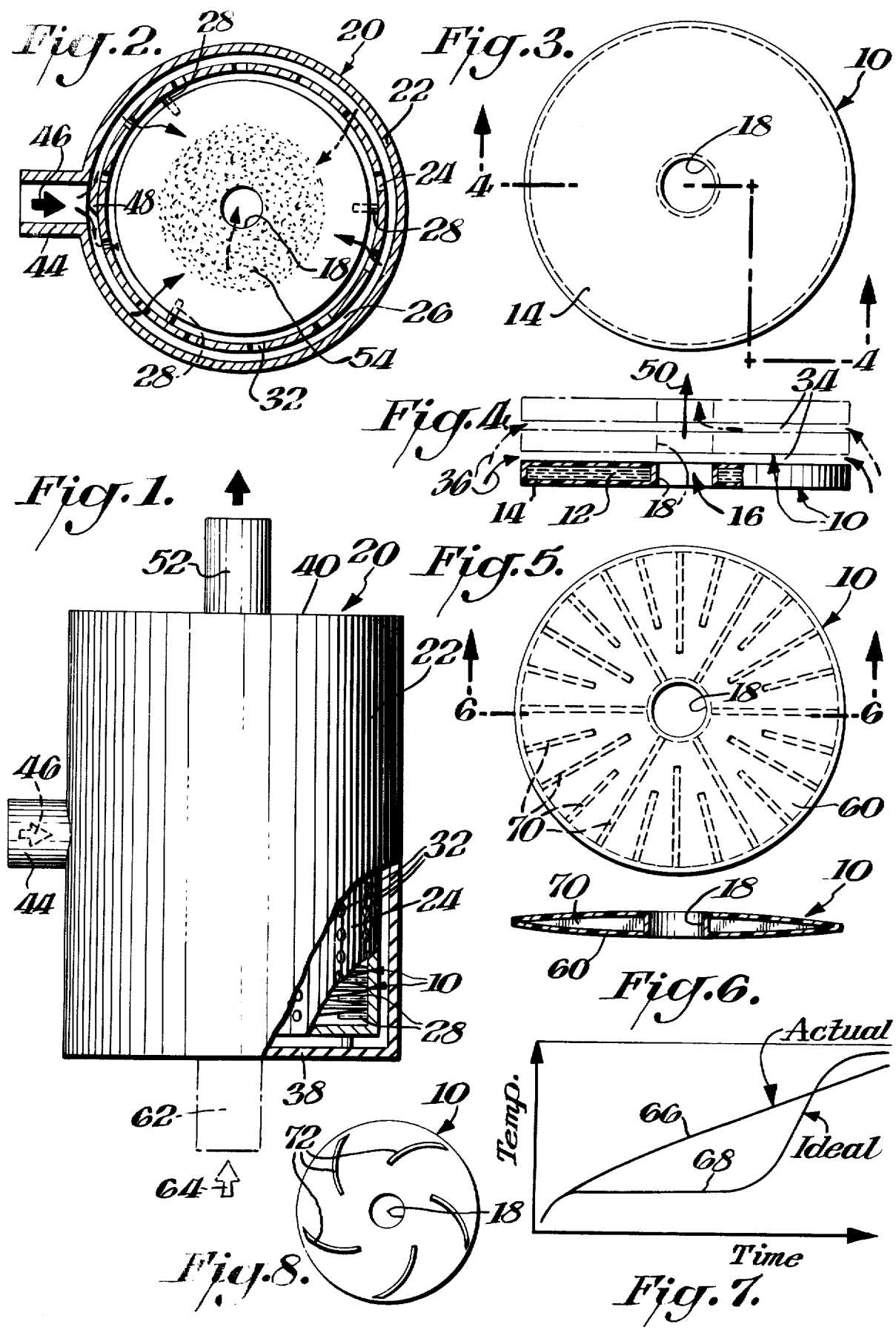

HEAT EXCHANGE APPARATUS

BACKGROUND OF THE INVENTION

This invention relates to a heat exchange apparatus, and more particularly, to a heat exchange apparatus which facilitates the uniform transfer of heat.

Many heat exchange devices have been developed over the years. These devices have as their purpose the tranfer of heat from one substance to another. These various configurations and designs have envisioned myriads of small tubes, conduits, plates and other configurations all directed toward achieving a maximum amount of transfer of heat between the substances in question. In some instances this substance may be fluids; in other cases they may be gases or solids.

In recent years much work has been directed toward making greater usage of the radiant heat energy of the sun. One method of effecting such usage of the sun's energy for heating purposes is to utilize a thermal energy storage material which is capable of storing heat energy. A material is selected that has a freezing point or a boiling point at or around the temperatures which may be generated by the sun's heat energy. The sun's heat energy is then stored by converting the state of the substance from a solid to a liquid or to a liquid from a gas using, respectively, the heat of fusion or the heat of vaporization of the substance.

In this manner, relatively small weights of materials may be used to store large amounts of heat. For example, when using thermal energy storage materials on sunny winter days, air that has been heated by solar collectors on the roof, say, of a house may be fed past the basement containers of a heat exchange unit filled with the thermal energy storage material (hereinafter referred to as TES). The TES then melts in the process and thereby stores heat for evening use. In the summer the system may be used in the reverse. The cool incoming night air freezes the TES such that it may cool the warm air coming in during the day as it melts. The melting of the TES material in effect is a cooling process which absorbs heat from the surrounding air. Conversely, the freezing process of the TES material gives up heat to the air and thus may be referred to as a heating process.

Whatever the TES material used, it is necessary, particularly for home heating and cooling, that the heating and cooling processes utilizing the TES material be such that heat is withdrawn from or stored in the TES material uniformly, i.e., at a known constant rate. Many of the present day heat exchange units do not achieve such uniform heat transfer. On the contrary, many heat exchange units tend to transfer heat energy more slowly as the TES material melts and decreases in surface area and mass.

It is, therefore, an object of this invention to provide an improved heat exchange apparatus which is capable of a more uniform exchange of heat between a thermal storage material and a surrounding fluid.

Another object of this invention is to provide an improved heat exchange apparatus which effects a more uniform melting or freezing of the thermal storage material.

BRIEF DESCRIPTION OF THE INVENTION

According to this invention, a heat exchange apparatus is constructed comprising a plurality of ring-like, disc-shaped closed containers adapted to hold a first thermal energy storage material. The containers are disposed in a stacked array with each container being spaced from an adjacent container. The center portion of each of the ring-like containers, being open, defines a conduit generally perpendicular to the plane of the disc. The stacked array is housed in a bonnet means which directs a second fluid radially inward between and across the faces of the containers and then out through the conduit, thereby to achieve a more uniform heat transfer between the thermal energy storage material and the second fluid. In alternative embodiments of the invention, the containers may be shaped to decrease in thickness as a function of radius and may be double convex, plano-convex, or concavo-convex, by way of example. In still other alternatives, a fluid may be directed through the conduit formed by the center holes to aid the inward flow of the second fluid. Further, external fins may be placed on the containers in a configuration to create a vortex of the in flowing second fluid.

BRIEF DESCRIPTION OF THE DRAWINGS

The novel features that are considered characteristic of this invention are set forth with particularity in the appended claims. The invention itself, however, both as to its organization and methods, as well as additional objects and advantages thereof, will best be understood from the following description when read in connection with the accompanying drawings, in which:

FIG. 1 is a side elevation view partially cut away of a heat exchange unit constructed in accordance with one embodiment of this invention;

FIG. 2 is a cross-sectional view of the heat exchange unit illustrated in FIG. 1 taken along a sectional line of the exchange disc as will be described;

FIG. 3 is a top plan view of the heat exchange unit depicted in FIG. 1;

FIG. 4 is a cross-sectional view, taken along the section line 4—4 of FIG. 3, depicting a cross-section of one of the disc-like containers employed in the heat exchange unit of this invention;

FIG. 5 is a top plan view of a container that may be used in the heat exchange unit, constructed in accordance with this invention, using an alternative form of disc having fins;

FIG. 6 is a cross-sectional view of the disc container depicted in FIG. 5 taken along the section line 6—6;

FIG. 7 is a plot of temperature versus time depicting the actual and ideal temperature transfer characteristics of heat exchange devices; and FIG. 8 is a plan view of a container that may be used in the heat exchange unit of this invention in which external fins are used.

DETAILED DESCRIPTION OF THE PREFERRED EMBODIMENTS

One embodiment of the invention is depicted in FIGS. 1 through 4 of the drawing. In these figures there is seen a heat exchange device which includes a stacked array of ring-like, disc-shaped closed containers 10. Each of these containers 10 is hollow and is filled with a thermal energy storage material (hereinafter referred to as TES material) such as sodium sulfate-decahydrate ($Na_2SO_4 \cdot 10\ H_2O$). In its usual form the sodium sulfate-decahydrate melts at 90° F.; however, with the addition of other salts such as sodium chloride, amonium chloride and similar salts, the melting point may be reduced to various temperatures, typically ranging down to 50°

F. This chemical salt and salt eutectics have a relatively heat of fusion in the neighborhood of 100 Btu/lb.

Among the TES materials that may be used are other inorganic salt hydrates and eutectics of such salts, organic salts and carbohydrides (waxes), sulfur, and other materials which melt at the desired temperature at which heat shall be stored.

The containers 10 which are sealed to encapsulate or contain the TES material 12 may be formed of a polyolefin plastic or any of the ABS plastics (acrylonitryl-butadyene-styrene) or metals having good heat conductivities like aluminum. Other suitable plastics or metals which have a relatively high strength and may have a relative high heat conductivity may be used as well. Preferably, when one of the polyolefin plastics is used, the face walls 14 of the disc-shaped container 10 may be formed to have a thickness of about ⅛ inch so as not to significantly impair heat transfer between the TES material 12 and the surrounding atmosphere.

Each of the containers 10 is closed and is formed to have a central opening or hole 16 such that when the discs are stacked, as illustrated in FIG. 4, for example, they form an exhaust conduit 18 (FIG. 2). In the illustrated form, each of the containers 10 is in the shape of a flat disc with parallel faces and a central hole 16 such that they are generally in the shape of a flat doughnut.

The containers 10 are supported in a stacked array, as depicted in FIG. 4, such that each of the discs is parallel to each other and the discs are spaced apart slightly. The discs are held or supported in this stacked array coaxially within a bonnet 20 which includes an outer shell 22 and a coaxially disposed inner shell 24 so as to form an annular conduit or chamber 26 therebetween. Supports 28 are disposed radially inwardly from the inner shell 24 to support the containers 10 in the stacked array. The radius of the containers 10 is slightly less than that of the inside radius of the inner shell 24 such that they may fit in the stacked array within the bonnet 20.

A plurality of orifices or holes 32 is formed in the inner shell 24 to permit air or other fluid (either gas or liquid) to flow from the annular chamber 26 inwardly through the annular space 34 between the containers, as depicted by the arrows 36, to the central exhaust conduit 18 formed by the holes 16 of the several containers 10. The bonnet also has a bottom face 38 and a top face 40 which completes the bonnet 20 and forms a completely closed housing for the stacked array. Inlet air for the annular chamber 26 is directed through an inlet 44 and flows, as illustrated by the arrow 46, to impinge against a deflector 48 such that it is divided to flow, in both directions, circumferentially through the annular chamber 26 of the bonnet 20. The orifices 32 either may be spaced at greater distances at the inlet end of the annular chamber or, as is depicted, the holes may have a smaller diameter at the inlet end of the annular chamber 26 than those at the opposite side of the chamber. This facilitates an even distribution of the air flow about the entire circumference of the annular chamber 26. In this manner, air is permitted to flow through the annular chamber 26 and thence uniformly, radially inwardly through the several holes 32 and the spaces 34 between the containers 10, thence upwardly as depicted by the arrow 50 through the central exhaust conduit 18 formed by the holes in the several containers. A central outlet 52 is connected to the top face 40 of the bonnet 20.

During this process, the air flow is relatively slow at the greater radial distances and speeds up as the radial distance is decreased such that even though the air may be cooler or hotter at the smaller radial distances, its greater velocity permits greater heat transfer towards the central portions of the containers 10. This velocity relationship may be expressed by the formula $V = V_o f(1/r)$ where $V_o$ is the initial velocity of the air flow or fluid flow at the greatest radial distance, and $r$ is the radial point of the flow. In this manner it is seen that the heat transferred between the TES material in the containers 10 and the fluid may be expressed by the general formula $Q = UA(\Delta T)$ where $U$ is a unit of heat transmittance which is affected by fluid velocity, $A$ is the surface area of the containers, and $\Delta T$ is the difference in temperature. This facilitates effecting a uniform, more constant rate of heat transfer of heat between all of the TES material and the fluid flowing 36. The TES material melts or freezes relatively uniformly throughout the volume of the container 10.

In a typical application the inlet 44 has a cross-sectional area of 1 square foot, as does the outlet 52. The discs are roughly 36 inches across and the discs themselves are two inches in thickness at their outer part. There is a ¼ inch spacing between the discs and their center part and a typical bonnet is capable of holding 24 stacked discs.

In an alternative embodiment of the invention the outer surfaces of the containers 10 may be roughened near the center by scoring or otherwise, as is depicted at 54 in FIG. 2. This increases the surface area of the central portion of the disc and creates more turbulence of the air and improves the effectiveness of the heat transfer.

In still another embodiment of the invention, as is depicted in FIGS. 5 and 6, the containers 10 may be modified in shape such that their thickness decreases as a function of radius. Otherwise, the construction of each container is the same as that previously described and they are supported and spaced as described in the bonnet 20. The particular disc-like container illustrated is that having a configuration that may be described, with reference to optics, as double convex in shape. In this instance, in a typical application, the dimensioning may be the same except that the radial taper on the container may be decreased to roughly one-quarter of an inch from its inner 2 inch dimension, as previously described. The face walls 60 are constructed of the same material as previously described. In this application, the air velocity may be represented by the formula $V = f(1/r)^n$ where $n$ is greater than one and $f(1/r)^n$ is a junction determined by the shape of the discs. Thus it is seen because of the increased velocity of air as the radius decreases, there is a greater ability to equalize melting or boiling of the TES material throughout the interior of the disc since the thicker portions of the disc have a greater air flow and hence are capable of greater heat transfer between the fluid flow and the encapsulated TES material.

In other applications, where the thickness of the container 10 decreases as a function of the radius of the container, again with reference to optics technology, the external configurations may be plano-convex or concavo-convex, to name a few.

In still other alternative embodiments of the invention, an additional auxiliary fluid inlet 62 (FIG. 1) may be placed in the bottom face 10 of the bonnet and an auxiliary flow of a fluid such as air, depicted by the arrow 64, is directed upwardly to The bonnet and through the central exhaust conduit 18 formed by the holes in the several discs. Due to the Bernouli effect of the rapidly moving air flow 64 moving upwardly through the central exhaust conduit 18, the fluid pressure in the spaces 34 between the disc is decreased and the radially inward flow therethrough enhanced.

The benefits of this invention may be more clearly understood with reference to FIG. 7 in which there is illustrated a plot with temperature as the ordinant and time as the abscissa. Two curves are illustrated. One, curve 66, depicts the heat transfer characteristic in a typical heat exchange unit of the prior art in which the temperature of the air varies gradually with an increase in time. This results because partial melting reduces the actual surface area of prior art exchangers as a function of time. Hence, heat is transferred more slowly as a function of time. This is not entirely suitable for heat exchange units, particularly those applicable to heating and cooling of solar houses for which the heat exchange unit of this invention is ideally suited. It is more desirable that heat be transferred at a relatively uniform rate such as exemplified by the transfer characteristic depicted by the ideal curve 68. With such transfer characteristic, the temperature of flowing air is maintained relatively constant as a function of time due to the equalized melting throughout the heat storage containers 10.

In still another alternative embodiment of the invention, vertically disposed radial fins 70 may be placed within each of the containers. These radial fins may be of metal to improve the heat transfer throughout the thickness of the containers 10 and may be of different radial lengths. Also, alternatively, the plastic for the container or the fins may be a metallized plastic with the express purpose of improving their heat transfer characteristics. For that matter, the containers may be constructed of a metal.

A further embodiment of the invention is illustrated in FIG. 8 in which a container 10 has formed on both faces, spiral-like external fins 72. The effect of such fins is to create a vortex in the radial inward air flow to further enhance the uniform heat transfer rate by increasing the heat transfer at the central portion of the disc-like containers. Such fins preferably are formed of metal or metallized plastic for their heat transfer properties.

There has thus been described an improved heat exchange unit wherein a thermal storage material is encapsulated preferably in plastic discs and the configuration and structure of the heat exchange unit and the disc-like containers is such that the melting or fusing of the TES material is relatively uniform throughout the containers.

Many embodiments may be made of this inventive concept, and many modifications may be made in the embodiments hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims, as far as the prior art permits.

What is claimed is:

1. Heat exchange apparatus comprising in combination:

a plurality of ring-like, disc-shaped closed containers each adapted to hold a first material, said containers being disposed in a stacked array with each container being spaced from an adjacent container, to form a first passageway between adjacent containers, the center portion of each said ring-like container defining a conduit generally perpendicular to the plane of the disc in conduit relationship with said first passageway to form thereby a continuous passage of a fluid through said apparatus, and in conduit relationship with each of the other said perpendicular conduits in said other discs to form a second passageway therewith and with each said first passageway, and bonnet means for directing said fluid radially and inwardly through said passageways and then out of said apparatus, thereby to achieve an efficient heat transfer between said fluid and said first material, there being in said containers heat storage material as said first material.

2. An apparatus according to claim 1 wherein said containers each have a plano-convex shape.

3. An apparatus according to claim 1 wherein said containers each have a concavo-convex shape.

4. An apparatus according to claim 1 wherein said containers each have a double convex shape.

5. An apparatus according to claim 4 wherein each said container is symmetrical about the plane of said disc.

6. An apparatus according to claim 5 wherein the inner annular portion of said containers is roughened to increase the surface area for contact by said fluid.

7. An apparatus according to claim 5 wherein each said container has formed therein inwardly extending, radially directed fins for providing a heat-conductive path from the interior of said container to the exterior.

8. An apparatus according to claim 7 wherein said bonnet means includes an annular chamber about the periphery of said containers, the inner portion of said chamber defining perforations therein to admit said second fluid, said chamber also having an inlet.

9. An apparatus according to claim 8 wherein said perforations have varying sized openings which increase as a function of the circumferential distance from said inlet.

10. An apparatus according to claim 1 wherein said bonnet means includes an annular chamber about the periphery of said containers, the inner portion of said chamber defining perforations therein to admit said second fluid, said chamber also having an inlet.

11. An apparatus according to claim 10 wherein said perforations have varying openings which increase as a function of the circumferential distance from said inlet.

12. An apparatus according to claim 1 wherein said containers are in the shape of discs having parallel faces.

13. An apparatus according to claim 1 wherein said containers have a thickness which varies inversely as a function of radius.

14. An apparatus according to claim 1 wherein said containers have external fins disposed on at least one face extending perpendicularly to the plane of the disc and spiral-like in configuration, thereby to create a vortex in the in-flowing air in the central portion of the containers.

15. Heat exchange apparatus comprising in combination:

a plurality of ring-like, disc-shaped closed containers having therein a first, contained material and each having an annulus whose thickness varies inversely as a function of its radius, said containers being disposed in a stacked array with each container being spaced from its adjacent containers to form first passageways between adjacent containers;

the center portion of each ring-like container defining a conduit generally perpendicular to the plane of the disc in conduit relationship with respective first passageways, and in conduit relationship with each of the other said perpendicular conduits in said other discs to form second passageways therewith, and bonnet means for flowing a second material radially and inwardly through said passageways and then out through said apparatus, thereby to achieve an efficient heat transfer between said contained material and said flowing material, there being in said containers heat storage material as said first material.

* * * * *